United States Patent [19]

Holloway

[11] Patent Number: 4,844,351

[45] Date of Patent: Jul. 4, 1989

[54] METHOD FOR SEPARATION, RECOVERY, AND RECYCLING OF PLASTICS FROM MUNICIPAL SOLID WASTE

[76] Inventor: Clifford C. Holloway, 4018 Cypress Ave. SW., Huntsville, Ala. 35805

[21] Appl. No.: 171,458

[22] Filed: Mar. 21, 1988

[51] Int. Cl.$^4$ ............................................. B02C 23/24
[52] U.S. Cl. ....................................... 241/19; 209/4; 209/11; 209/930; 241/23; 241/24; 241/DIG. 38
[58] Field of Search ............... 210/222, 223, 695, 768, 210/769, 770, 774, 778, 806, 808, 771; 209/11, 38, 39, 40, 930, 3, 4, 172; 425/203, 500; 71/14, 13, 25; 435/161, 163, 165, 807; 426/53; 521/40, 45, 40.5; 241/20, 79.1, DIG. 38, 23, 24, 19

[56] References Cited

U.S. PATENT DOCUMENTS

| | | | |
|---|---|---|---|
| 3,587,851 | 6/1971 | Anderson | 209/930 |
| 4,033,907 | 7/1977 | Wolf | 521/40.5 |
| 4,106,627 | 9/1978 | Watanabe et al. | 209/38 |
| 4,264,352 | 4/1981 | Houser | 71/14 |
| 4,342,830 | 8/1982 | Holloway | 71/14 |
| 4,511,091 | 4/1985 | Vasco | 241/23 |
| 4,540,495 | 9/1985 | Holloway | 210/808 |
| 4,570,861 | 2/1986 | Zentgraf et al. | 241/DIG. 38 |
| 4,607,797 | 8/1986 | Enikolopow et al. | 241/23 |

FOREIGN PATENT DOCUMENTS 2520598 11/1975 Fed. Rep. of Germany ........ 521/45

OTHER PUBLICATIONS

Publication by J. F. Laundrie and J. H. Klungness, "Dry Methods of Separating Plastic Films from Waste Paper", Paper Trade Journal, Feb. 5, 1973, pp. 34–36 class 209, subclass 11.

Primary Examiner—Peter Hruskoci
Assistant Examiner—Joseph Drodge

[57] ABSTRACT

A method for treatment of mixed wastes containing various plastics, such as municipal solid wastes, in which mechanical agitation and heat distortion of plastic films cause rupture and spilling of the contents of plastic film containers in the wastes. The wastes are introduced into a processing unit with means of heating and mechanical agitation of the contents. By the method in this invention, the plastics are separated and recovered as a mixture that may be recycled as a composite plastic used in the manufacture of various products or that may be further separated into identifiable types of plastics for recycling. The quantity of plastics recovered from MSW is greatly increased compared to previous processes using steam heat to achieve separation of the components of such mixed wastes.

8 Claims, 3 Drawing Sheets

METHOD FOR SEPARATION, RECOVERY, AND RECYCLING OF PLASTICS FROM MUNICIPAL SOLID WASTE

FIELD OF THE INVENTION

This invention to a method for treatment of mixed waste materials containing various types of plastics, including municipal solid wastes (MSW) to separate and recover the plastics.

BACKGROUND OF THE INVENTION

Plastics are composed of a variety of polymers such as acrylics, styrenes, phenolics, vinyls, esters, amides, ureas, carbonates, silicones, epoxies, ethylene, propylene, and cellulose derivatives. Each of these polymers has specific properties that are fairly unique for the material and its intended uses. Most plastic products or components are made from virgin plastic feedstocks, but in recent times, some products and components are being made from recycled plastics. The percentage of plastics in mixed wastes, such as MSW, has shown and is expected to continue to show a gradual increase with time. This increase in percentage is due in part to the reduced energy use, simplicity of manufacturing, and the lower costs of raw materials and labor when compared to similar items made of metals or glass. As a corollary, an increasing quantity of products and components are being made from mixtures of recycled plastics which yield a composite plastic material with its own unique properties and acceptance in a variety of applications.

Heretofore, methods of treatment of mixed wastes, such as MSW, have included disposal in sanitary landfills, mass incineration, preparation and combustion of refuse derived fuel (RDF), and size reduction for composting. Each of these methods results in the loss of the plastics by either burying, blending with soil, or combustion, and each has undesirable consequences. Plastics treated in landfills or composting are not really lost, but become nearly permanent components of the disposal site due to the chemical resistance and nonbiodegradable nature of these polymers. In the combustion of plastics, hydrocarbons, dioxins, furans, acid gases, and $NO_x$ emissions in the stack gases of mass burn or RDF incineration facilities can be major sources of air pollution with rather severe health and environmental consequences unless stringent pollution control measures are observed.

Heretofore, the recycling of plastics has been primarily practiced by the plastic manufacturers themselves by the recycling of manufactured rejects into the virgin feedstocks. Source separation and recycling of certain mixed waste components, such as aluminum, glass, newspapers, and cardboard have been implemented to some extent by individuals, organizations, businesses, small communities, and in a few instances, even large cities. Plastics, however, have not been a major recycling component for source separation partly because of a lack of public awareness of the diversity of plastics and partly because of a lack of markets and economic incentives for recycled plastics. Even with the recent changes in the potential for source separation and recycling of plastics, education of the public and development of marketing networks for small scale recycling efforts may be long term. Source separation even in the best examples has resulted in only about a 30% reduction in the waste stream reaching disposal sites.

In my prior U.S. Pat. No. 4,342,830, dated Aug. 3,1982, steam treatment of MSW is disclosed wherein the sterilized and softened organics are forced through perforations upon sudden release of pressure whereby inorganics and certain synthetics, such as metal cans, glass, and the like are left behind. This method included the addition of significant quantities of water to the wastes and thus required substantial energy consumption in the form of steam to heat the water/waste slurry and to force the resultant sterile and softened organics through the perforations in a singular step. The internal steam pressure requirements of 20 to 100 psig and the resultant temperature range of approximately 228° to 328° F. for periods of 20 to 120 minutes also caused a melting of many plastics and significant heat distortion of most other plastics. Even at the minimum time of 20 minutes at the minimum steam pressure of 20 Psig, many of the low density plastic foams and films are melted and co-mingled with fabrics, paper, etc. making separation virtually impossible. The plastics thus recovered which were suitable for recycling were generally less than 2% of the waste by weight and volume and were generally severely contaminated with softened organics and dirt. The inorganic materials such as ferrous and non-ferrous metals were also similarly contaminated making these products less desirable for recycling. The glass components were both broken and contaminated.

In my prior U.S. Pat. No. 4,540,495 dated 10, 1985, steam treatment was again disclose wherein the amount of water added prior to steam treatment was significantly reduced to conserve the energy consumed and to reduce the moisture content of the softened organic fraction to only 60 to 70% by weight. The internal steam pressure requirements of 40 to 75 psig with the resultant temperature range of 270 to 320° F. for periods of 30 to 90 minutes to cook and sterilize the waste material and soften the organic matter also caused a melting of many plastics and significant heat distortion of most other plastics as in the previous U.S. Pat. No. 4,342,830. However, in the case of U.S. Pat. No. 4,540,495 the contents of the process unit were separated externally into various components. Again, at the minimum time of 30 minutes at the minimum steam pressure of 40 psig, the low density plastics in particular are melted and co-mingled with other components. The severity of melting plastics is actually more extensive due to the higher pressure and longer time than in the earlier patent. The plastics recovered in this manner were more suitable for recycling, but generally only about 2% of these waste by weight and volume was recoverable as plastics in this manner. The inorganic materials such as ferrous and non-ferrous metals were also more suitable for recycling. The glass components were also cleaner, but were broken, making separation and recovery more difficult.

As much as 8% by weight of MSW today is plastic, and plastic may account for 10 to 15% of MSW by weight by the year 2000, making it the fastest growing component of MSW. Thus, it is both economically and environmentally sound that methods be devised to facilitate separation, recovery, and recycling of a greater quantity of plastic from mixed wastes, such as MSW, than has been possible with the methods disclosed in either U.S. Pat. No. 4,342,830 or U.S. Pat. No. 4,540,495.

SUMMARY OF THE INVENTION

A general object of my invention is to maximize the recovery of all potentially recyclable components of mixed wastes, such as MSW, to reduce the quantities of wastes for landfill disposal, and to improve the quality of such wastes for incineration by removing the metals, plastics, synthetic fabrics, and the like prior to combustion. The resultant air emissions and ash from waste incineration should thus contain fewer potentially polluting products which are generally believed to be produced in the incineration of plastics, synthetics, and metals, in particular.

Another object of my invention is to provide improved means for treatment of mixed wastes, such as MSW, to facilitate separation, recovery, and recycling or other uses of plastics, ferrous metals, nonferrous metals, glass, paper, fabrics, and other such materials and components of mixed wastes as are practical and economical.

A more specific object of my invention is to provide improved yields of plastic components in easily identifiable form for separation and recovery for recycling. With the increased quantities recovered and the ability to segregate the various plastics into their respective types, the overall economics of separation, recovery, and recycling of plastics is much improved.

Another object of my invention is to improve the yield of unbroken glass containers, thus facilitating the recovery of glass that may be easily color sorted. Color sorted glass has a higher value for recycling than mixed color glass.

An additional object of my invention is to reduce the energy required for steam treatment of mixed wastes, such as MSW, by omitting the addition of any water other than the inherent moisture of the mixed wastes which varies from about 10 to 35% by weight and by reduction of the vessel temperature and steam pressure to less than 228° F. and 20 psig, respectively.

I provide a new method for treating mixed wastes containing a variety of plastics, such as MSW, wherein the waste is introduced into a processing unit and subjected to continuous agitation and heat in the temperature range of 120° F. to 228° F. The heat is supplied in the form of a saturated steam atmosphere inside the waste-filled processing unit interior which is pressure sealed and continuously agitated to insure uniform distribution and heat transfer of the steam throughout the waste. Within the heated vessel interior, the plastic film bags containing wastes become heat distorted, losing their tensile strength, and with the continuous heat and agitation these plastic film bags rupture, spilling the contained wastes. Under the controlled conditions of agitation, temperature, and time of exposure, the ruptured film plastics and other low density plastics remain sufficiently intact such that when the vessel is de-pressurized and the contents are emptied, these plastics and also higher density plastics are easily identifiable and separable from the other components of the treated wastes. The separation of the components is accomplished in a conventional manner using methods and equipment known in the art.

BRIEF DESCRIPTION OF THE DRAWINGS

A process flow schematic and an apparatus which may be employed to accomplish my improved process or method are illustrated in the accompanying drawings which form a part of this disclosure and in which.

DESCRIPTION OF A PREFERRED EMBODIMENT

Figure 1:
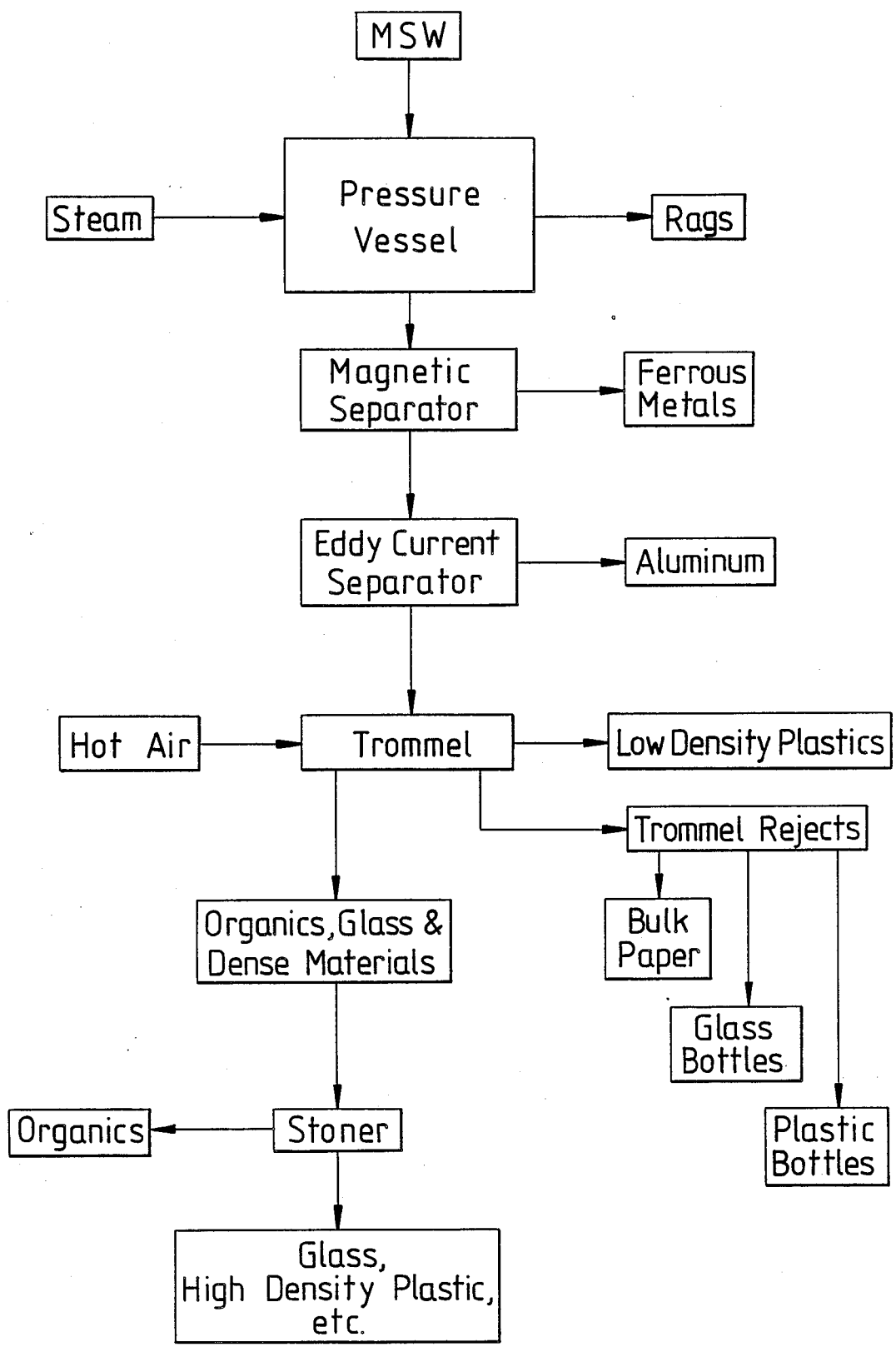
FIG. 1 is a process flow schematic showing an example of the steps involved in the treatment of MSW to accomplish the separation of the recyclable components.
Figure 2:
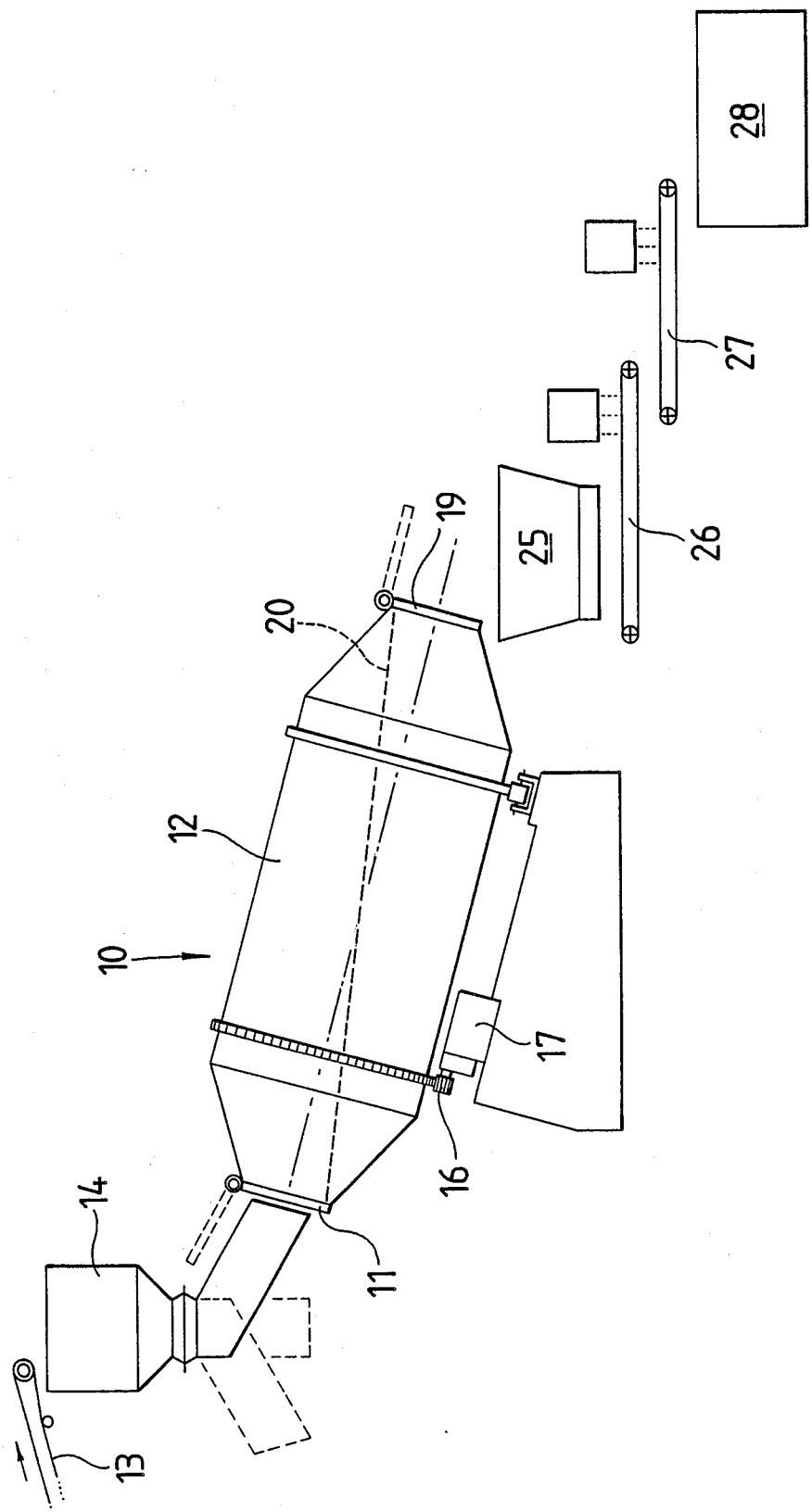
FIG. 2 is an illustration of mechanical devices that may be used in the treatment of MSW and separation of recyclable components.
Figure 3:
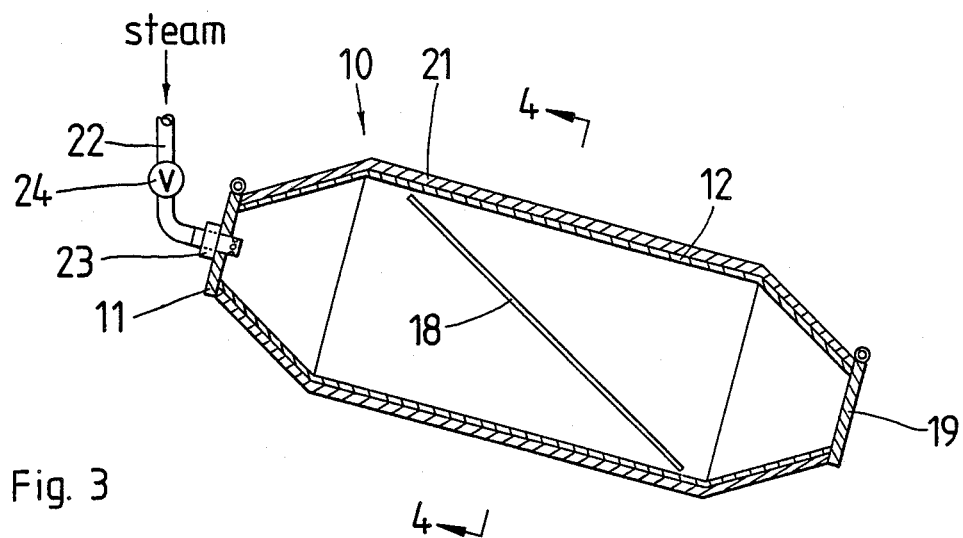
FIG. 3 is a sectional view taken along the longitudinal axis of an apparatus for treating the MSW with steam to accomplish this new method.
Figure 4:
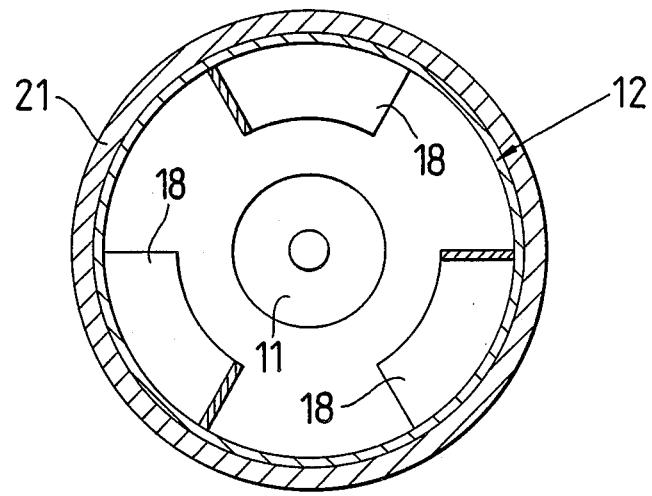
FIG. 4 is a sectional view taken along a transversal of the apparatus shown in FIG. 3.

Referring to the drawings for a better understanding of my invention, I show a process unit 10 having a removable hatch 11 located at the inclined end of the cylindrical vessel through which MSW is introduced into the cylindrical vessel 12 of the process unit 10. The MSW is delivered to the hatch 11 by suitable means, such as an endless conveyor belt indicated generally at 13 from which the MSW is directed into the hatch 11 by gravity via a chute or hopper 14. The cylindrical vessel of the process unit 10 is agitated by means of rotation of the entire cylinder about a central axis of rotation along the longitudinal axis of the cylinder 12. The rotation is accomplished by a gear mechanism 16 driven by a motor 17. A ribbon type flighting 18 is attached to the interna wall of the cylinder 12 for example at an angle of approximately 30° relative to the longitudinal axis of the cylindrical vessel as shown in FIG. 3. Preferably, the cylindrical vessel of the process unit 10 is inclined for example at approximately 15° from the horizontal whereby gravity aids in the introduction of MSW into the vessel at 11, and in the discharge of the processed MSW via a vessel discharge hatch 19, and in the agitation and mixing of the vessel contents by the rotation of the cylinder about the central axis and the lifting action of the internal flighting 18. The flighting 18 provides a means of linear conveyance within the vessel interior. The flighting 18 is installed such that in this example when the vessel is rotated in a first angular direction about its central axis the MSW is conveyed by the flighting and the effect of gravity due to the inclined angle of the vessel away from the removable hatch 11 and toward the discharge hatch 19. By reversal of the direction of rotation about the central axis, the flighting 18 provides a means of linear conveyance away from the discharge hatch 19 and toward the removable hatch 11. In the reverse rotational mode, the linear conveyance is counteracted by the force of gravity due to the lifting and falling action caused by the 30° angle of the flighting and by the 15° angle of repose of the rotating cylinder 12 from horizontal. The reverse rotation in this example thus provides a means of internal agitation and mixing of the vessel contents.

The MSW is introduced into the cylindrical vessel 12 by suitable means, such as described above, with the discharge hatch 19 in the closed position. The removable hatch 11 is replaced and secured by suitable means. The vessel 12 is capable, when the hatches are suitably secured, of withstanding a temperature of at least 228° F. and an internal pressure of at least 20 psig. The cylindrical vessel exterior surface is covered with suitable insulating material 21 to conserve heat energy and to prevent injury to workers. After securing the hatches, the cylindrical vessel 12 is rotated by means as given in the example above in a reverse direction to cause lifting of the contents by the flighting 18 and counteracting the lifting action by the force of gravity. The mixing action within the vessel is dependent upon the vessel configuration, e.g. length to diameter of the cylinder, the angle of the internal flighting relative to the longitudinal axis of the cylinder, the height of the flighting from the interior vessel wall toward the central axis of rotation, the ratio of the volume of waste relative to the internal volume of the vessel, the angle of repose of the cylinder relative to horizontal, the particle size and configuration of the components being mixed, and the speed of rotation of the vessel. The design of such a vessel to provide for proper agitation of the vessel contents taking into account all such variables is well known in the art to which my invention relates, no further description thereof is deemed necessary.

Heat is supplied in the form of saturated steam to the vessel 12 through a conduit 22 which communicates with a rotating sealing device 23 which is known in the art to connect the stationary conduit with the rotating vessel thus providing for continuous injection of steam into the vessel interior while continuously rotating the vessel. By such means, the vessel contents are mixed and exposed to the heated atmosphere of saturated steam to insure contacting of the wastes for uniform heat distribution and heat transfer. Such uniform contacting of the wastes and steam is dependent upon the factors above to accomplish proper mixing and upon the original temperature and moisture content of the wastes introduced into the vessel and upon the capacity of steam delivery into the vessel interior. Again, design of such a device to provide for optimum heat distribution and heat transfer throughout the vessel contents is well known in the art, thus no further description thereof is deemed necessary.

Saturated steam is introduced continuously into the vessel with continuous rotation and mixing of the contents through a pressure regulating valve 24 to maintain the steam pressure within the vessel 12 ranging from approximately 2.0 to 20.0 psig to achieve the desired temperature range of 120° F. to 228° F. The time period of heating in the vessel to achieve the desired heat distortion of the plastic film containers ranges from approximately 15 minutes at the highest temperature to 1 hour or more at the lowest temperature. Preferably, the waste material in the vessel is heated with saturated steam until the internal vessel pressure reaches approximately 10–15 psig and is then continuously maintained at 10–15 Psia for 1 hour. The vessel is continuously agitated during both the heat-up and cooking periods. That is, in actual practice, I have found that the most efficient internal environment within the vessel 12 is provided where the waste material is subjected to a saturated steam pressure of approximately 10–15 psig for approximately 60 minutes after reaching temperature and pressure. The corresponding temperature range is approximately 190° F. to 215° F., which causes the heat distortion of the film plastics and loss of tensile strength resulting in the rupture of the film bag containers and spilling of the contents. After the time period of treatment, the steam pressure is released via a suitable vent for reclamation of the heat and vapor in the vented steam.

The products are removed from the vessel via the discharge hatch 19 which is detachable into a product hopper 25. To aid in the removal of product, the vessel is rotated to convey the material in the direction of the hatch 19 using the internal flighting 18, as in the example which would be in a first angular direction. Alternatively, the product may be removed via the removable hatch 11 into a product hopper located at the opposite end of the vessel from 19. In this latter case, the product is conveyed to hatch 11 by rotation of the vessel in a reverse direction via the internal flighting 18. In either case, the product is removed from the vessel 12 into a product hopper, such as 25. The products may be subjected to a conventional ragger 20 either internally of vessel 12 or subsequent to processing in vessel 12 for the removal of fabrics.

The products are then conveyed from the product hopper 25 using a suitable conveyor, such as an endless belt conveyor 26, which is electromagnetic for removal of ferrous metals which are magnetic. Such magnetized belt conveyors are well known in the art of separation of ferrous metals, and no further description thereof is deemed necessary. The ferro-magnetc metals thus removed would be conveyed to a specific container or area for recycling.

With the ferrous metals removed, the product is then conveyed to an eddy current device 27 which detects and separates the aluminum from the remainder of the product. The aluminum thus removed is conveyed to a specific container or area for recycling.

The product stream with the ferrous metals and aluminum removed is conveyed to a trommel 28 which separates low density plastic by entraining the plastic in a hot air stream passing through the trommel and bulk paper and glass and plastic containers are separated by size in the trommel as is known in the art. The remaining municipal solid waste, primarily organics, broken glass, high density plastics, etc. can be processed as conventional MSW. That is, the remaining broken glass, high density plastics, etc. and non-ferrous metals can be separated out conventionally as with a stoner, and the organics recycled, combusted, or disposed of.

The above process is illustrated in a particular sequence in a particular form. It will be appreciated that the steps subsequent to removal of the MSW from the vessel 12 are conventional and some of the steps may not be called for at each installation. Furthermore, it will be appreciated that some of the steps may occur in a different order at some installations.

Comparative analysis of the present invention with the process defined in U.S. Pat. No. 4,342,830 obtained the following results.

EXAMPLE 1

Residential MSW was treated at the minimum conditions stated in my previous patent (U.S. Pat. No. 4,342,830) of 20 psia steam pressure for 20 minutes. Although the yield of plastics were about 8% in this test, there was significant heat distortion of the foam and film plastics under these conditions and several examples were found in the greater than 2-inch fraction where these low density plastics had melded onto metal cans, paper, and rags. By comparison, test runs on multiple batches of residential MSW at 12–15 psig steam pressure for even 1 hour did not result in such distortions of foam or film plastics, and no evidence of melding of plastics to metals, paper, and rags was observed. In multiple test runs on residential MSW under the minimum stated conditions in my second previous patent (U.S. Pat. No. 4,540,495 of 40 psia for 30 minutes the yield of plastics was reduced to only 2–3% with even more extensive heat distortion and melding of plastics to other components and the apparent disappearance of foam and film plastics as identifiable products.

EXAMPLE 2

In a series of tests, twelve (12) batches of residential MSW were treated using 12-15 psia steam pressure for one hour (see Table 1), and seven (7) batches of residential MSW were treated using 55-60 psia steam pressure for one hour (see Table 2). The purposes of these tests was to compare the yields of recyclable components obtained under these sets of conditions. Notice that these tables show only the results of the recyclable components greater than 2-inch to facilitate recovery by the simplest methods known in the art of materials separation. Notice also, in Table 2, that glass cannot be recovered due to breakage to pieces less than 2 inches under the stated conditions. Further, rags were not separated in the Table 2 runs, although the yields are expected to be similar to those in Table 1 and possibly higher due to the melding of plastics with the fabric materials.

The most striking difference between the results is seen in the glass and plastic yields. As stated before, glass cannot be recovered in the greater than 2-inch fractions in the 55-60 psia runs due to breakage. The plastic yield is increased 4-fold by reducing the steam pressure to 12-15 psia. The plastics are also obtained in readily identifiable forms for separation, including the low density foam and film plastics. The resultant plastic yield increase has definite economic and environmental benefits. The resultant glass recovery also has economic benefits. The lower pressure and temperature effects of the present process result in an overall increase in the quantity of recyclable materials from about 14% to 21.5% (including rags in both totals). This improves the recyclable recovery from MSW by steam classification by more than 50%.

From the foregoing it may be seen that my process for pretreating MSW offers a significant improvement in MSW treatment and particularly in the recovery of plastics.

While I have shown my invention in one form, it will be obvious to those skilled in the art that it is not so limited but is susceptible of various changes and modifications without departing from the spirit thereof.

What I claim is:

1. A method for treatment of mixed wastes containing various plastics in plastic film containers to enhance the recoverability of said plastics comprising:
  (a) introducing a predetermined quantity of mixed wastes into a pressure chamber;

TABLE 1

Summary of Test Runs on Residential MSW using 12-15 psia Steam Pressure for 1 Hr and Resultant Yields of Recyclable Materials

| Run No. | Total Wt. MSW IN | Total Wts Out (>2-Inch) | | | | |
|---|---|---|---|---|---|---|
| | | Plastics | Aluminum | Ferrous | Glass | Rags | Total |
| 1 | 620 lbs | 53 lbs | 8 lbs | 23 lbs | 7 lbs | 38 lbs | 129 lbs |
| 2 | 633 | 49 | 14 | 39 | 48 | 18 | 168 |
| 3 | 524 | 40 | 9 | 29 | 26 | 17 | 121 |
| 4 | 663 | 47 | 6 | 37 | 26 | 15 | 131 |
| 5 | 611 | 50 | 7 | 28 | 28 | 13 | 126 |
| 6 | 525 | 42 | 7 | 17 | 13 | 10 | 89 |
| 7 | 513 | 54 | 7 | 30 | 37 | 46 | 174 |
| 8 | 634 | 50 | 9 | 34 | 33 | 17 | 143 |
| 9 | 590 | 40 | 8 | 28 | 20 | 17 | 113 |
| 10 | 652 | 42 | 5 | 25 | 10 | 12 | 94 |
| 11 | 584 | 52 | 7 | 31 | 1 | 19 | 110 |
| 12 | 594 | 59 | 13 | 32 | 33 | 4 | 141 |
| X̄ | 595.3 | 48.2 | 8.3 | 29.4 | 23.5 | 18.8 | 128.3 |
| S | 48.76 | 5.83 | 2.56 | 5.77 | 13.16 | 11.22 | 24.8 |
| % | 100 | 8.09 | 1.40 | 4.94 | 3.95 | 3.16 | 21.55 |

TABLE 2

Summary of Test Runs on Residential MSW using 55-60 psia Steam Pressure for 1 Hr (U.S. Pat. No. 4,540,495) and Resultant Yields of Recyclable Materials

| Run No. | Total Wt. MSW IN | Total Wts Out (>2-Inch) | | | | |
|---|---|---|---|---|---|---|
| | | Plastics | Aluminum | Ferrous | Glass | Rags | Total |
| 1 | 602 lbs | 7 lbs | 14 lbs | 25 lbs | * | ** | 46 lbs |
| 2 | 610 | 16 | 24 | 36 | * | ** | 76 |
| 3 | 650 | 8 | 22 | 24 | * | ** | 54 |
| 4 | 1206 | 26 | 27 | 103 | * | ** | 156 |
| 5 | 605 | 17 | 11 | 48 | * | ** | 76 |
| 6 | 562 | 10 | 11 | 49 | * | ** | 70 |
| 7 | 499 | 10 | 15 | 21 | * | ** | 46 |
| | 676.3 | 13.4 | 17.7 | 39.1 | * | ** | 74.9 |
| | 22.06 | 6.23 | 6.04 | 27.51 | * | ** | 35.28 |
| % | 100 | 1.99 | 2.62 | 5.79 | * | ** | 11.07 |

*Glass broken to less than 2-inch
**Rags were not separated

The yields of ferrous metals are similar, but are somewhat higher in Table 2 due to contamination from melded plastics and paper pulp inside the metal containers. The yield of aluminum is significantly higher in Table 2 due to the contamination by plastics and paper pulp inside the aluminum beverage cans. The proportion of contamination of aluminum appears to be higher than ferrous, but this is due to the much lighter density of aluminum compared to ferrous containers.

heating said mixed waste to about 195° F. to 215° F. at a pressure of about 10.0 to 15.0 psia for a processing period of between about 15 minutes to one hour by introducing saturated steam into said pressure chamber to rupture said plastic film containers;
(c) agitating said mixed waste during said processing period; and
(d) removing said mixed waste from said pressure chamber for classification for recycling; and
(e) separating and recovering said plastics.

2. method as defined in claim 1 wherein said pressure chamber is essentially cylindrical and is inclined at a predetermined angle from horizontal wherein said agitating step comprises continuously rotating said chamber about its longitudinal axis while injecting steam thereinto.

3. A method as defined in claim 1 further comprising partially classifying said mixed waste removed from said pressure chamber by magnetically separating ferrous metals in said mixed waste from the remainder of said mixed waste.

4. A method as defined in claim 3 further comprising further classifying said mixed waste by eddy current detection of aluminum products and subsequent removal of aluminum products from the remainder of said mixed waste.

5. A method for treatment of mixed wastes containing various plastics in plastic film containers to enhance the recoverability of said plastics comprising:
(a) heating said mixed wastes in mass to a temperature of about 195° F. to about 215° F. at a pressure of about 10.0 to 15.0 psia by introducing saturated steam into a pressure chamber for a processing period of between 15 minutes to one hour, to reduce the tensile strength of plastics therein without melting said plastics;
(b) continuously agitating said mixed wastes while heating said wastes;
(c) maintaining said pressure on said mixed wastes while heating and agitating said mixed wastes to rupture said plastic film containes sufficiently to permit classification of said mixed wastes for recycling, and
(d) separating and recovering said plastics.

6. The method as defined in claim 5 further comprising the steps subsequent to said heating and agitating steps of:
(a) magnetically removing ferrous metals from said mixed wastes;
(b) removing aluminum from said mixed wastes subsequent to eddy current detection of said aluminum;
(c) mechanically separating glass and plastic containers, as well as bulk paper, from the remainder of said mixed wastes;
(d) mechanically removing cloth from said mixed wastes using a ragger; and
(e) pneumatically separating low density plastics from said mixed wastes in a hot air stream.

7. The method as defined in claim 5 wherein said heating and agitating of said mixed wastes are carried out in a cylindrical pressure vessel inclined at a predetermined angle with respect to the horizontal and wherein said agitating is performed by rotating said pressure vessel about its longitudinal axis.

8. The method as defined in claim 5 further comprising the steps subsequent to said heating and agitating of:
(a) magnetically removing ferrous metals from said mixed waste;
(b) removing aluminum from said mixed wastes using eddy current detection;
(c) mechanically separating glass and plastic containers, as well as bulk paper, from the remainder of said mixed wastes;
(d) mechanically removing cloth from said mixed waste using a ragger; and
(e) pneumatically separating low density plastics from the remainder of said mixed waste in a hot air stream.

* * * * *